United States Patent
Paulsen

(10) Patent No.: US 8,907,913 B2
(45) Date of Patent: Dec. 9, 2014

(54) BACKSCATTER STYLUS FOR USE WITH TOUCHSCREEN

(75) Inventor: Keith L. Paulsen, Centerville, UT (US)

(73) Assignee: Cirque Corporation, Salt Lake City, UT (US)

( * ) Notice: Subject to any disclaimer, the term of this patent is extended or adjusted under 35 U.S.C. 154(b) by 7 days.

(21) Appl. No.: 13/571,019

(22) Filed: Aug. 9, 2012

(65) Prior Publication Data
US 2013/0201120 A1  Aug. 8, 2013

Related U.S. Application Data

(60) Provisional application No. 61/521,481, filed on Aug. 9, 2011.

(51) Int. Cl.
| | |
|---|---|
| *G06F 3/041* | (2006.01) |
| *G06F 3/033* | (2013.01) |
| *G06F 3/0354* | (2013.01) |
| *G06F 3/038* | (2013.01) |
| *G06F 3/044* | (2006.01) |
| *G06F 3/046* | (2006.01) |

(52) U.S. Cl.
CPC ............ *G06F 3/033* (2013.01); *G06F 3/03545* (2013.01); *G06F 3/0383* (2013.01); *G06F 3/044* (2013.01); *G06F 3/046* (2013.01); *G06F 2203/0384* (2013.01); *G06F 2203/04106* (2013.01)
USPC .......................................................... 345/173

(58) Field of Classification Search
None
See application file for complete search history.

(56) References Cited

U.S. PATENT DOCUMENTS

| 3,347,614 | A | * | 10/1967 | Fuller et al. .................... 359/573 |
| 5,790,106 | A | * | 8/1998 | Hirano et al. ................. 345/173 |
| 7,511,705 | B2 | * | 3/2009 | Silk et al. ...................... 345/179 |
| 7,532,203 | B2 | * | 5/2009 | Sharma ......................... 345/173 |
| 2004/0056850 | A1 | * | 3/2004 | Jaeger ........................... 345/179 |
| 2004/0239652 | A1 | * | 12/2004 | Taylor et al. .................. 345/179 |
| 2005/0083316 | A1 | * | 4/2005 | Brian et al. .................... 345/179 |
| 2008/0150916 | A1 | * | 6/2008 | Vos ................................ 345/179 |
| 2008/0150917 | A1 | * | 6/2008 | Libbey et al. ................. 345/179 |
| 2008/0150918 | A1 | * | 6/2008 | Hagen et al. .................. 345/179 |
| 2008/0156546 | A1 | * | 7/2008 | Hauck ......................... 178/19.01 |
| 2008/0309490 | A1 | | 12/2008 | Honkanen et al. |
| 2010/0085325 | A1 | * | 4/2010 | King-Smith et al. ......... 345/174 |
| 2010/0252335 | A1 | | 10/2010 | Orsley et al. |
| 2010/0271188 | A1 | | 10/2010 | Nysen |
| 2011/0164001 | A1 | * | 7/2011 | Seo et al. ...................... 345/179 |
| 2013/0002614 | A1 | * | 1/2013 | Nowatzyk et al. ............ 345/179 |

* cited by examiner

*Primary Examiner* — David D Davis
(74) *Attorney, Agent, or Firm* — Morriss O'Bryant Compagni, PC

(57) ABSTRACT

A stylus touch sensor and an inexpensive, battery free, wireless backscatter stylus, the stylus touch sensor including a host radio frequency (RF) antenna for generating a magnetic field, an electrode grid for detecting finger touches, and a stylus reader circuit for detecting a signal from a backscatter stylus, and the backscatter stylus having a first circuit for using the magnetic field to generate an electrical current for powering the backscatter stylus, and a second circuit for generating a backscatter signal that is detectable by the stylus reader circuit.

16 Claims, 6 Drawing Sheets

BACKSCATTER STYLUS

BACKSCATTER STYLUS FOR USE WITH TOUCHSCREEN

CROSS REFERENCE TO RELATED APPLICATIONS

This document claims priority to and incorporates by reference all of the subject matter included in the provisional patent application Ser. No. 61/521,481, filed Aug. 9, 2011.

BACKGROUND OF THE INVENTION

1. Field of the Invention

This invention relates generally to touchpad and stylus technology. More specifically, an inexpensive, battery free, wireless digitizer pen or stylus may be constructed for use with CIRQUE® Corporation touchpads by the addition of Radio Frequency Backscatter communication to the current CIRQUE® Corporation wired pen.

2. Description of Related Art

There are several designs for capacitance sensitive touchpads. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which site of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

With this understanding of one capacitance sensitive touchpad, it is now possible to discuss the present invention and a particular application because of shortcomings in state of the art designs.

A wired stylus is used with a touchpad as described above by coupling a dedicated sense line input of touchpad circuitry to a stylus. It would be a further advantage over the existing wired stylus to incorporate backscatter technology into the stylus to enable the pen to be wireless and to simplify and reduce the cost.

BRIEF SUMMARY OF THE INVENTION

In a first embodiment, the present invention is a combination of a stylus touch sensor and an inexpensive, battery free, wireless backscatter stylus, the stylus touch sensor including a host radio frequency (RF) antenna for generating a magnetic field, an electrode grad for detecting finger touches, and a stylus reader circuit for detecting a signal from a backscatter stylus, and the backscatter stylus having a first circuit for using the magnetic field to generate an electrical current for powering the backscatter stylus, and a second circuit for generating a backscatter signal that is detectable by the stylus reader circuit.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow. It should also be understood that the terms "touchpad", "touch sensor", "touchscreen", "touch input device" and "touch sensitive device" may be used interchangeably throughout this document.

Figure 1:
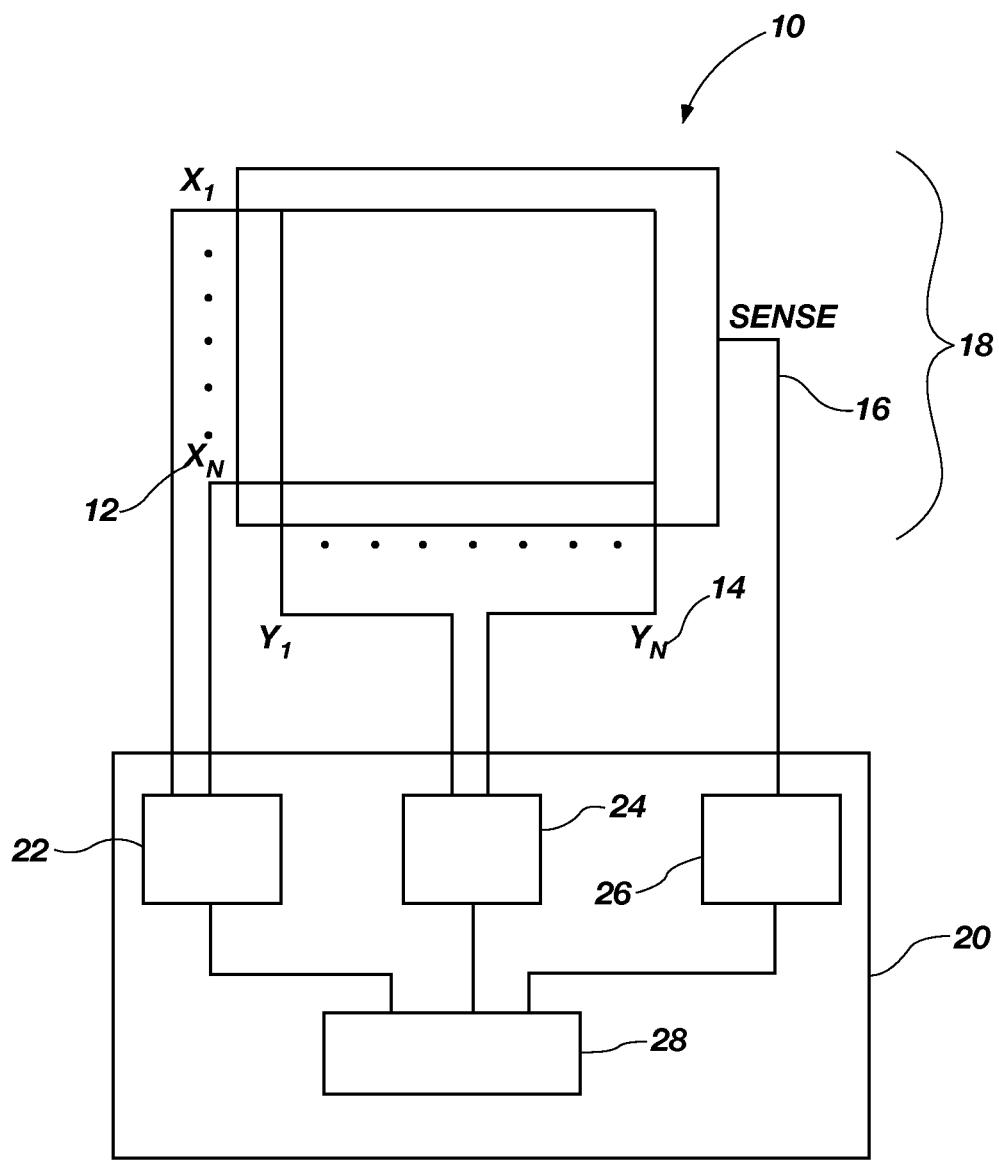
FIG. 1 is a block diagram of the components of a capacitance-sensitive touchpad as made by CIRQUE® Corporation and which can be operated in accordance with the principles of the present invention.
Figure 2:
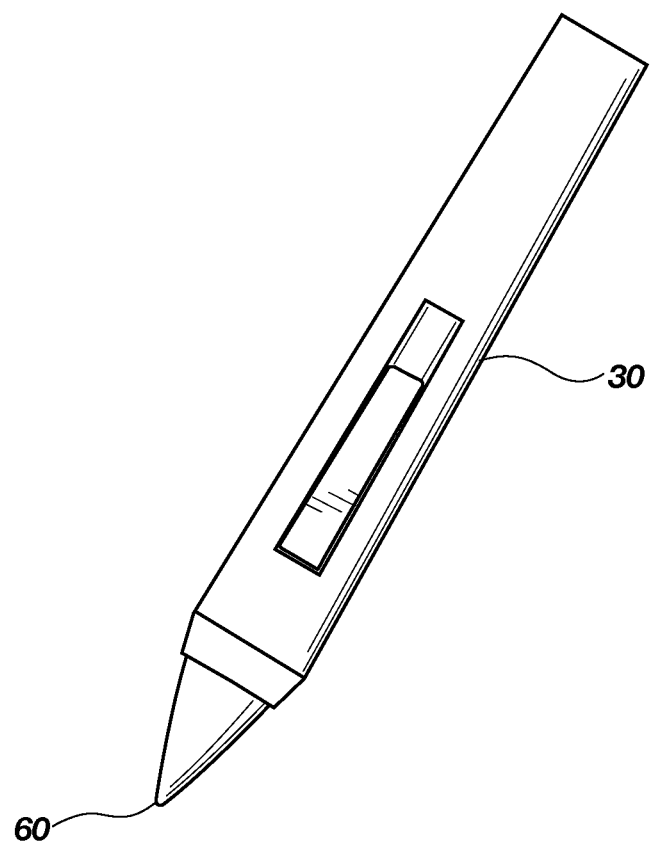
FIG. 2 is a perspective view of a stylus that incorporates the features of a first embodiment of the present invention.

FIG. 2 is a perspective view of a backscatter stylus 30 that incorporates the features of a first embodiment of the present invention. The present invention is a modification of an existing wired stylus that is presently used in combination with a CIRQUE® Corporation touchscreen. Modifications are required to both the wired stylus and to the touchscreen with which it can function. The purpose of the modifications is to make it possible for circuitry that is added to the touchscreen circuitry to detect a signal from the backscatter stylus and determine a location or position of the backscatter stylus on the touchscreen.

Figure 3:
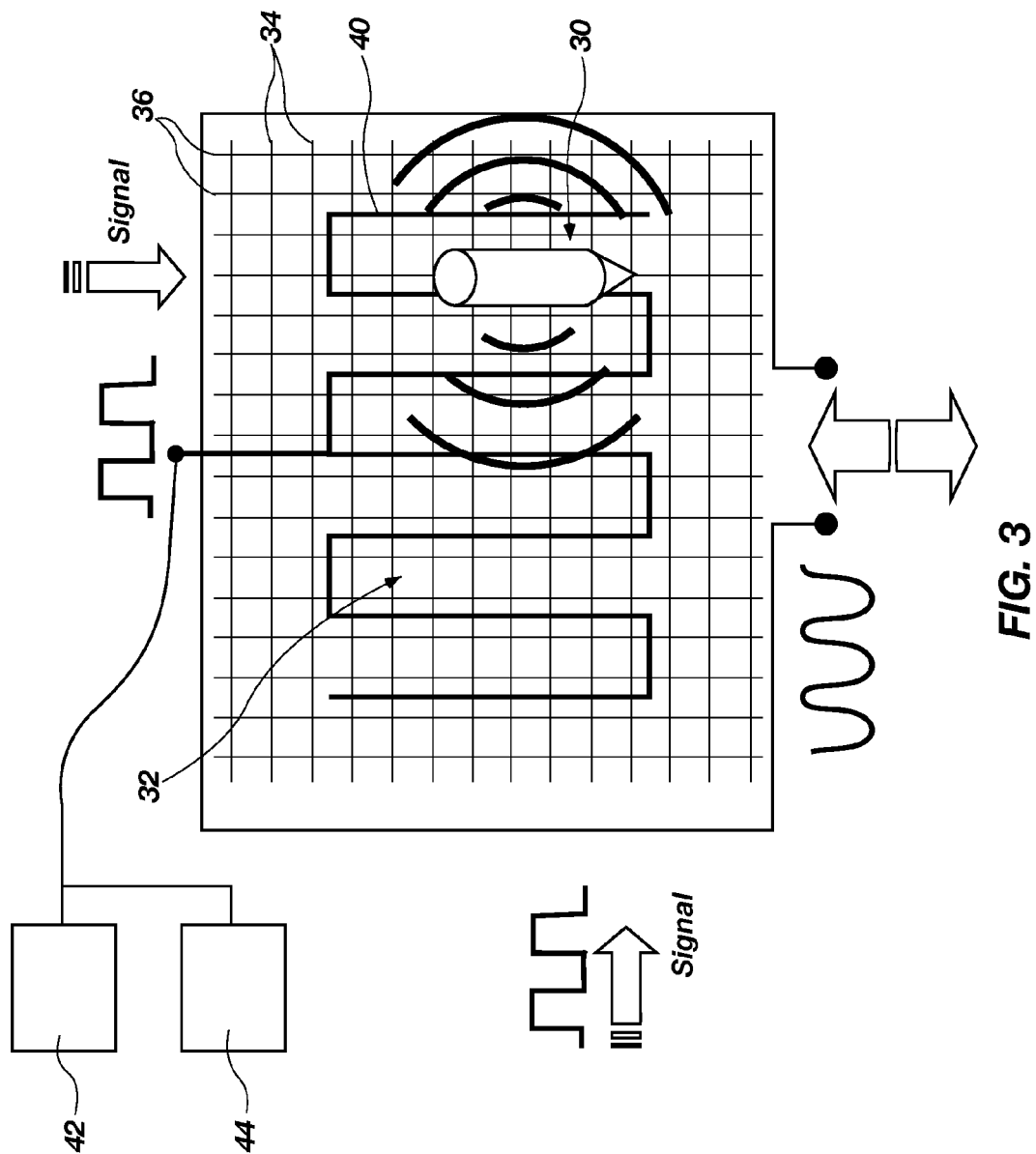
FIG. 3 is a schematic diagram describing the operation of the present invention.

FIG. 3 is a schematic diagram describing operation of the present invention. FIG. 3 shows the touchscreen 32 and the components that may be included in order to function with a wireless backscatter stylus 30. The touchscreen 32 is comprised of an electrode grid having a first electrode axis 34 which is orthogonal to but co-planar with a second electrode axis 36, wherein each of the electrode axes are comprised of a plurality of parallel electrodes that are separated from each other by a dielectric material. One axis functions as drive electrodes while the other axis functions as sense electrodes, and then the roles are reversed.

A Host RF antenna 40 is embedded in a touchscreen substrate. In other words, the Host RF antenna 40 is another layer of the touchscreen 32, and may be under the axes 34, 36 (electrode grid), on top of the axes, or is in some way disposed so that it is coincident, with the axes of the touchscreen. The Host RF antenna 40 is used to generate a magnetic field that is coincident with the surface of the touchscreen 32. The function of the magnetic field is to induce a current in the backscatter stylus 30.

The touchscreen 32 includes an RF stimulator oscillator circuit 42. RF stimulator oscillator circuit 42 is coupled to the Host RF antenna 40 and generates a continuous wave (CW) in a UHF band that is used for RFID. For example, the CW may be in the UHF license free band at 13.56 MHz. The CW signal can be generated using a relatively inexpensive crystal oscillator or leverage CIRQUE® Corporations RFID solution that is used for reading payment cards to simultaneously support the backscatter stylus 30.

Figure 5:
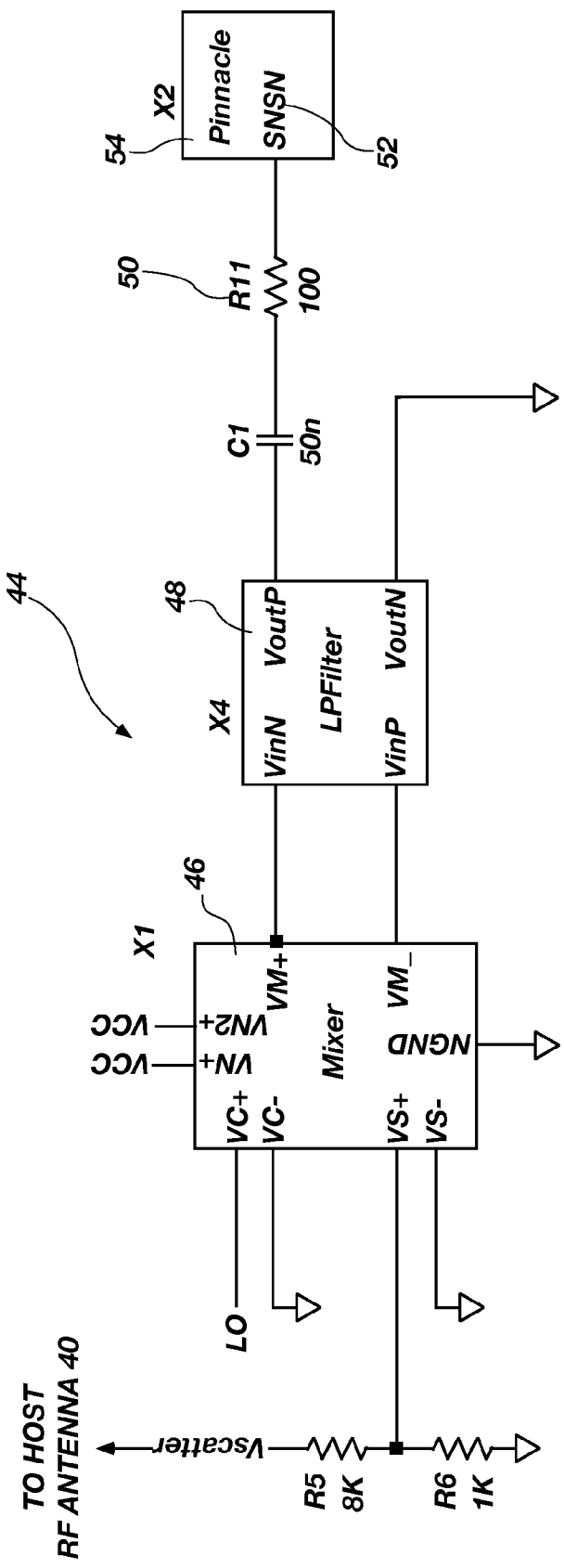
FIG. 5 is a stylus reader circuit schematic that is incorporated into a first embodiment of the present invention.

The Host RF antenna 40 is not only driven by the RF stimulator oscillator circuit 42, but it also receives an RF backscatter signal that is generated by the backscatter stylus 30. The Host RF antenna 40 is coupled to an RF Reader circuit 44 (see FIG. 5). The RF Reader circuit 44 includes a series capacitor in an RF Reader demodulator circuit.

The RF Reader demodulator circuit may be tuned with the Host RF antenna 40 to produce the high gain that may be required to detect the relatively small backscatter signal that is generated by the backscatter stylus 30. The backscatter signal from the backscatter stylus 30 may be detected, for example, by using a heterodyne mixer 46 or peak detector circuit in the RF Reader circuit 44.

The detected backscatter signal from the backscatter stylus 30 may be a representation of the electric field that is captured by the backscatter stylus 30. The backscatter stylus 30 is not grounded because it is wireless. Therefore, the resulting signal is a square wave signal. The detected backscatter signal is buffered through a filter 48 and fed through a resistor 50 directly into the SNSN pin 52 on a touchscreen processor 54 to emulate the integration method used in traditional CIRQUE® Corporation touchpads. The touchscreen processor 54 may be any of the processors used by CIRQUE® Corporation for analyzing signals from an electrode grid that is used in a touchscreen or touchpad.

The present invention is designed to use a signal being generated by the Host RF antenna 40 to create the power necessary to operate an electrical circuit inside the backscatter stylus 30. Accordingly, the backscatter stylus does not need a battery in order to function. The signal from the Host RF antenna 40 must be sufficient to operate the backscatter stylus 30. Thus, an electric current is induced in the backscatter stylus 30.

The backscatter stylus 30 includes a circuit for controlling the amount of current in the backscatter stylus. The modulated current is sufficient to generate a backscatter magnetic field of its own that is detectable by the touchscreen 32. The amplitude of the backscatter magnetic field that is generated is controlled by the circuitry inside the backscatter stylus 30.

Figure 4:
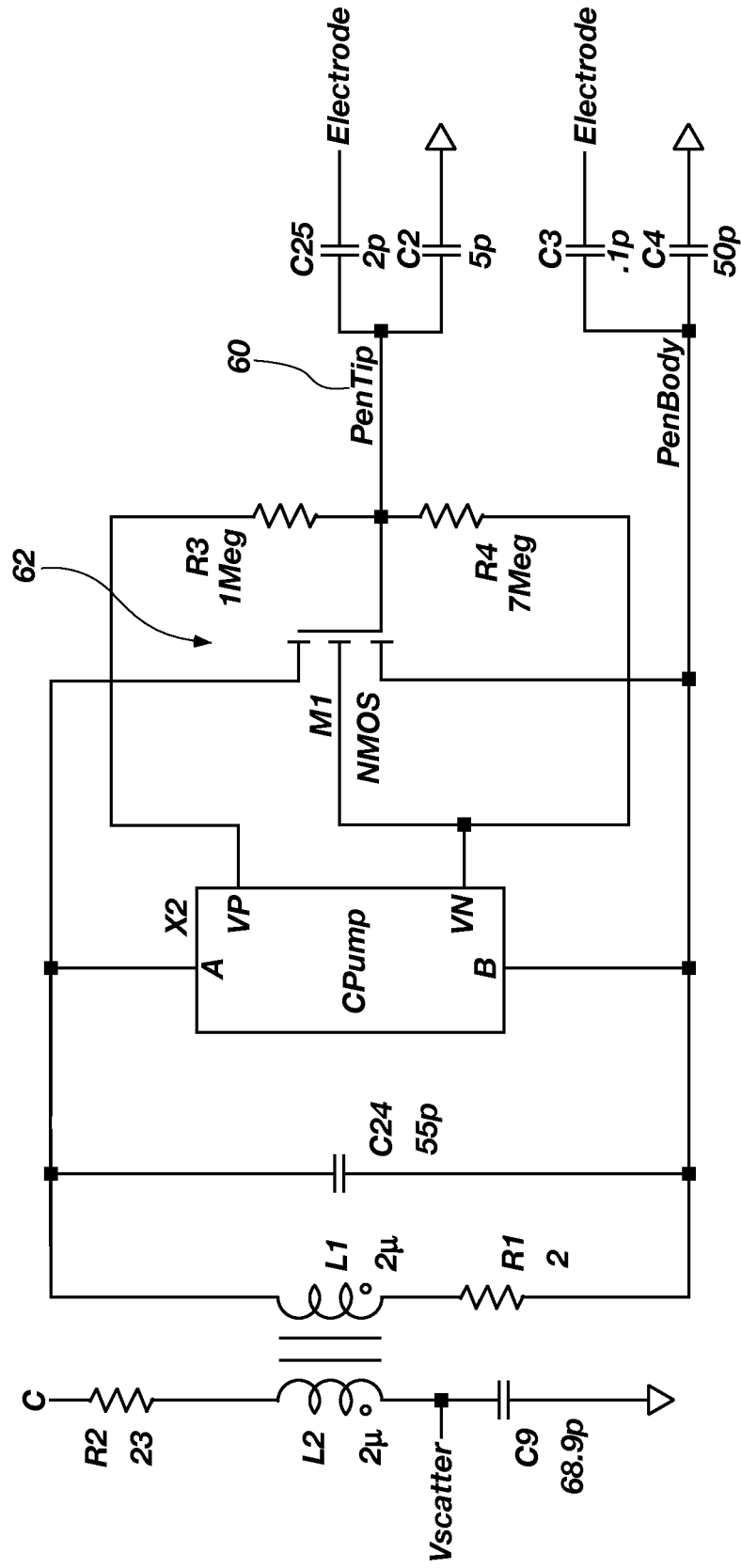
FIG. 4 is a backscatter stylus schematic of a first embodiment.

The backscatter stylus 30 includes backscatter stylus circuitry as shown in FIG. 4. An electric current may be induced in the backscatter stylus 30 in an RF antenna which may be a small wire coil that is inside and near a tip 60 on the end of the backscatter stylus. The electric current is induced by the magnetic field being generated by the Host RF antenna 40 embedded in the touchscreen 32.

The amount of electric current induced in the backscatter stylus 30 is controlled by an RF modulator transistor 62 that is placed in series with the RF antenna small wire coil. The modulated current coming from the RF modulator transistor 62 may produce a backscatter magnetic field having an amplitude that may be proportional to the controlling gate voltage signal on the RF modulator transistor 62.

The RF modulator transistor gate voltage is derived from the metal stylus tip 60 that is covered in plastic as it comes in proximity of toggling electrodes embedded in the substrate of the touchscreen 32.

Figure 6:
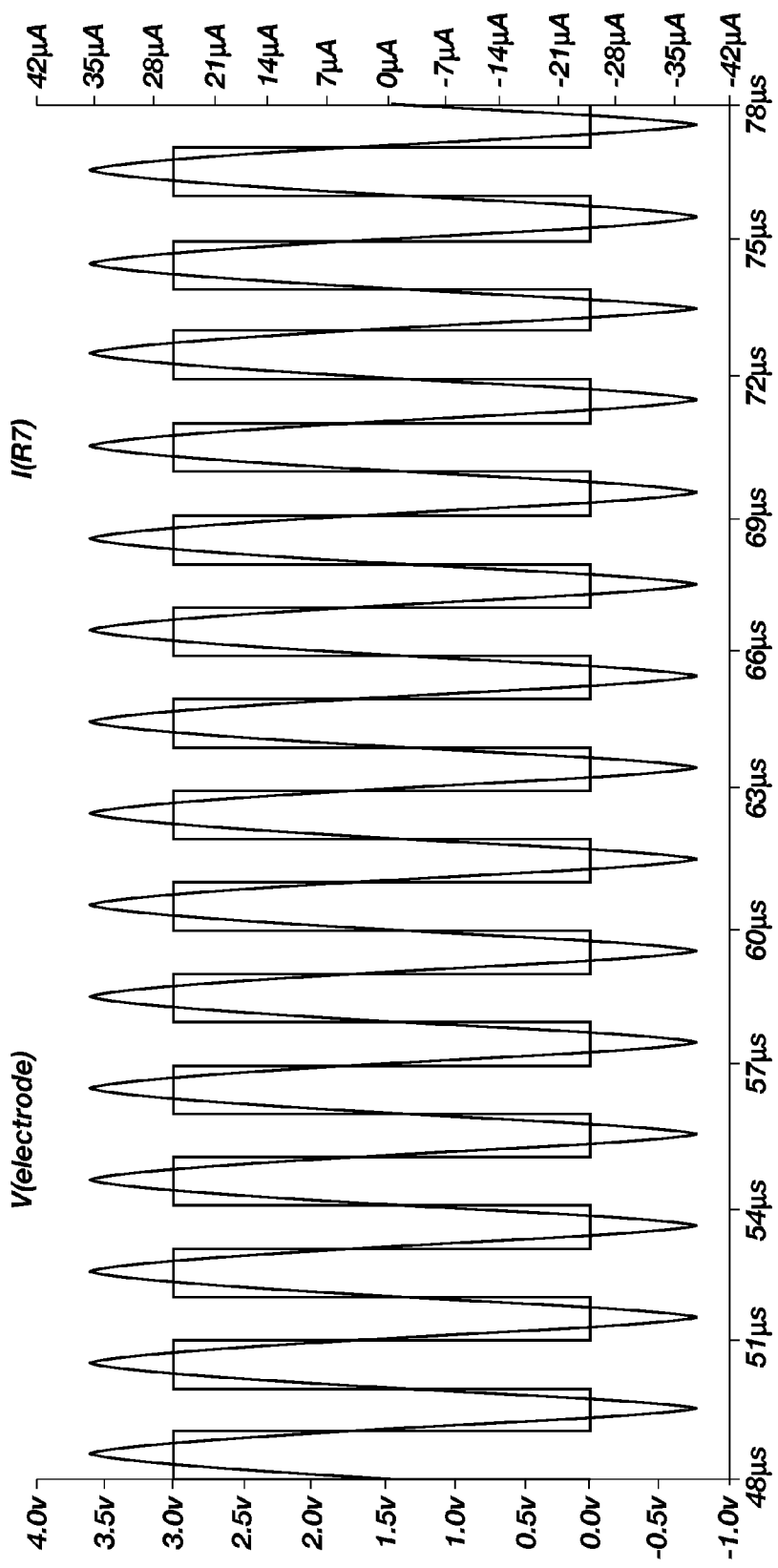
FIG. 6 is an electrode/SNS waveform.

FIG. 6 is an example of an electrode/SNSN waveform that may be generated during operation of the present invention, but should not be considered as limiting the operation thereof.

It is noted that some of the advantages of the present invention may include the fact that this stylus and touchpad solution is inexpensive. The backscatter stylus 30 does not require a battery to operate and is thus a passive device, and the backscatter stylus circuitry is simple and inexpensive. The Host RF antenna 40 is a simple electrode that can be embedded in the substrate of the touchscreen 32. The backscatter stylus 30 has no wire tether to break, and the backscatter stylus system is completely compatible with existing touchscreen circuitry that is already being used in existing products. The backscatter stylus system also has a small form factor that is consistent with current tethered pens on the market. Because the backscatter stylus system is compatible with existing CIRQUE® Corporation touchscreen processors, the system can operate using existing CIRQUE® Corporation RFID touchscreen design, and a single ASIC may support detection of the backscatter stylus 30, contactless payment cards and finger touches.

While it is understood that the backscatter stylus of the present invention was designed to replace a tethered stylus used in combination with a CIRQUE® Corporation touch sensor, the backscatter stylus can be adapted to operate with other touch sensors that can be modified to include a host RF antenna for generating a magnetic field to power the backscatter stylus. The Host RF antenna may be added after manufacturing of the touch sensor, or combined with it during manufacturing.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A data entry system including a stylus that is detectable by a touch sensor, said system comprised of:
   a touch sensor including a host radio frequency (RF) antenna for generating a magnetic field, an electrode grid for detecting finger touches, and a stylus reader circuit for detecting a signal from a backscatter stylus; and
   the backscatter stylus having a first circuit for using the magnetic field to generate an electrical current for powering the backscatter stylus, and a second circuit for generating a backscatter signal that is detectable by the stylus reader circuit.

2. The system as defined in claim 1 wherein the system is further comprised of an RF stimulator oscillator circuit that is coupled to the host RF antenna to thereby generate a continuous wave (CW) signal that can be received by the backscatter stylus.

3. The system as defined in claim 2 wherein the CW signal is further comprised of a signal that is transmitted in an ultra-high frequency (UHF) band that is used for radio frequency identification (RFID) circuitry.

4. The system as defined in claim 1 wherein the stylus reader circuit is further comprised of an RF reader demodulator circuit that is tuned to have a high gain in order to receive the backscatter signal.

5. The system as defined in claim 4 wherein the RF reader demodulator circuit is further comprised of a heterodyne mixer for detecting the backscatter signal.

6. The system as defined in claim 4 wherein the RF reader demodulator circuit is further comprised of a peak detector circuit for detecting the backscatter signal.

7. The system as defined in claim 1 wherein the system is further comprised of a touch sensor processor for receiving the backscatter signal and determining a position of the backscatter stylus on the touch sensor.

8. The system as defined in claim 1 wherein the backscatter stylus is further comprised of:
   an RF antenna for detecting the magnetic field generated by the Host RF antenna and for inducing an electrical current; and
   an RF modulator transistor for modulating the induced electrical current and for generating a backscatter magnetic field that is detectable by the Host RF antenna.

9. A method of generating input for a touch sensor using a wireless stylus, said method comprising:
   1) providing a touch sensor including a host radio frequency (RF) antenna for generating a magnetic field, an electrode grid for detecting finger touches, and a stylus reader circuit for detecting a signal from a backscatter stylus;
   2) providing the backscatter stylus having a first circuit for using the magnetic field to generate an electrical current for powering the backscatter stylus, and a second circuit for generating a backscatter signal that is detectable by the stylus reader circuit;
   3) touching a tip of the backscatter stylus to a surface of the touch sensor;
   4) generating a signal from the host RF antenna;
   5) inducing an electrical current in the backscatter stylus to provide power to the backscatter stylus;
   6) generating a backscatter signal by the backscatter stylus;
   7) receiving the backscatter signal by the host RF antenna;
   8) transmitting the signal to the stylus reader circuit; and
   9) processing the backscatter signal to determine a location of the backscatter stylus on the surface of the touch sensor.

10. The method as defined in claim 9 wherein the system is further comprised of:
    1) providing an RF stimulator oscillator circuit that is coupled to the host RF antenna;
    2) generating a continuous wave (CW) signal that can be received by the backscatter stylus.

11. The method as defined in claim 10 wherein the method further comprises transmitting the CW signal in an ultra-high frequency (UHF) band that is used for radio frequency identification (RFID) circuitry.

12. The method as defined in claim 9 wherein the method further comprises:
    1) providing the stylus reader circuit with an RF reader demodulator circuit; and
    2) tuning the RF reader demodulator circuit with a gain that is high enough to receive the backscatter signal.

13. The method as defined in claim 12 wherein the method further comprises:
    1) providing a heterodyne mixer in the RF reader demodulator circuit; and
    2) detecting the backscatter signal.

14. The method as defined in claim 12 wherein the method further comprises:
    1) providing a peak detector circuit in the RF reader demodulator circuit; and
    2) detecting the backscatter signal.

15. The method as defined in claim 9 wherein the method further comprises:
    1) providing a touch sensor processor for receiving the backscatter signal; and
    2) determining a position of the backscatter stylus on the touch sensor.

16. The method as defined in claim 9 wherein the method further comprises:
    1) providing an RF antenna in the backscatter stylus for detecting the magnetic field generated by the Host RF antenna; and
    2) inducing an electrical current;
    3) providing an RF modulator transistor for modulating the induced electrical current; and
    4) generating a backscatter magnetic field that is detectable by the Host RF antenna.

* * * * *